United States Patent [19]

Yamazaki

[11] Patent Number: 5,235,349
[45] Date of Patent: Aug. 10, 1993

[54] OPTICAL SCANNER HAVING VARIABLE POWER FUNCTION AND SYSTEM USING THE SAME

[75] Inventor: Tatsuya Yamazaki, Zushi, Japan

[73] Assignee: Canon Kabushiki Kaisha, Tokyo, Japan

[21] Appl. No.: 981,942

[22] Filed: Nov. 23, 1992

Related U.S. Application Data

[63] Continuation of Ser. No. 609,733, Nov. 6, 1990, abandoned.

[30] Foreign Application Priority Data

Nov. 7, 1989 [JP] Japan .................................. 1-290914
Feb. 17, 1990 [JP] Japan .................................. 2-36719

[51] Int. Cl.$^5$ ............................................. G01D 9/42
[52] U.S. Cl. ................................. 346/108; 346/107 R; 346/160; 359/212
[58] Field of Search ............... 346/107 R, 76 L, 108, 346/160; 359/205, 206, 208, 211, 212, 213, 214, 215, 216, 220, 223

[56] References Cited

U.S. PATENT DOCUMENTS

| | | | |
|---|---|---|---|
| 4,318,582 | 3/1982 | Minoura et al. | 350/6.6 |
| 4,539,478 | 9/1985 | Sano | 346/108 X |
| 4,561,717 | 12/1985 | Kataoka et al. | 350/6.8 |
| 4,633,272 | 12/1986 | Hardy | 346/108 |
| 4,651,170 | 3/1987 | Chandler et al. | 346/108 |
| 5,068,677 | 11/1991 | Matsuura et al. | 346/108 |

FOREIGN PATENT DOCUMENTS

| | | |
|---|---|---|
| 0218636 | 4/1987 | European Pat. Off. |
| 3119461 | 2/1982 | Fed. Rep. of Germany |
| 55-155328 | 12/1980 | Japan |
| 60-26924 | 2/1985 | Japan |

Primary Examiner—Michael L. Gellner
Assistant Examiner—Patrick Stanzione
Attorney, Agent, or Firm—Fitzpatrick, Cella, Harper & Scinto

[57] ABSTRACT

An optical device includes a scanning means, a first image-formation optical system, and a second image-formation optical system. A system for a device, such as the one in which images are formed by scanning with this optical device. The scanning means scans a light beam emitted from a light source. The first image-formation optical system forms the light beam, scanned by the scanning means, into an image in a first spot diameter with respect to the scanning direction, on a surface to be scanned. The second image-formation optical system utilizes the first image-formation optical system and at least part of an optical system for forming the light beam scanned, by the scanning means, into an image in a second spot diameter which is different from the first spot diameter, with respect to the scanning direction, on the surface to be scanned. The first image-formation optical system scans the surface to be scanned within a first scanning range, whereas the second image-formation optical system scans the surface to be scanned within a second scanning range which is different from the first scanning range.

46 Claims, 6 Drawing Sheets

OPTICAL SCANNER HAVING VARIABLE POWER FUNCTION AND SYSTEM USING THE SAME

This application is a continuation of application Ser. No. 07/609,733 filed Nov. 6, 1990, now abandoned.

BACKGROUND OF THE INVENTION

1. Field of the Invention

The present invention relates to an optical scanner which is capable of altering the diameter of an image-formation spot and the scanning range on a surface to be scanned, and to a system for an image recording device or the like, using this optical scanner.

2. Related Background Art

An example of an optical scanning optical system which is mainly applied to a system for an image recording device or for an image reading device, and which can alter the diameter of a light spot on a surface to be scanned is disclosed in Japanese Laid-Open Patent Application Nos. 55-155328 and 60-26924. Such an optical scanning system is constructed as follows: as shown in FIG. 7, a portion, in which a scanning light beam becomes parallel to a light beam emitted from a light source, is provided between the light source and a deflecting device, such as a polygonal mirror, for scanning the light beam emitted from the light source. Converting the diameter of the light beam in that portion by an optical means, such as an afocal zoom expander, allows a spot diameter on an image-formation surface to be altered.

In addition to the above construction, another construction is also well known in which a light limiting means, such as an aperture stop having a variable diameter, is provided between a light source and a deflecting device for scanning a light beam emitted from the light source so as to convert the diameter of the light beam.

In the above-mentioned constructions, the diameter of the light beam emitted from the light source is converted by the optical means (the zoom expander or the aperture stop) arranged between the light source and the deflecting device. The light beam thus converted is scanned by the deflecting device, such as the polygonal mirror, thereby impinging upon an image-formation lens, such as an fθ lens. It then forms a light spot on the surface to be scanned, followed by scanning. For example, when the diameter of the light beam is converted to a small diameter, the spot diameter on the surface to be scanned becomes enlarged during an image formation on the image-formation lens, because the f-number grows substantially large. On the contrary, when the diameter of the light beam is converted to a large diameter, the spot diameter on the surface to be scanned is reduced.

In each of the above constructions, in brief, the diameter of the light beam is converted before the beam reaches the polygonal mirror. The diameter of the light beam impinging upon the image-formation lens, which is arranged between the polygonal mirror and the surface to be scanned, differs from the diameter of the light beam before the beam is converted. As a result, the spot diameter on the surface to be scanned can be converted.

However, it is not appropriate to use the above conventional means to obtain variable-powered images together with normal-sized images by altering the spot diameter for the following reasons.

As regards the above-mentioned former conventional example:

(1) In the device disclosed in the Japanese Laid-Open Patent Application No. 55-155328, since only the spot diameter of the light beam grows small, and since the scanning range as well as the scanning speed on the surface to be scanned remain unchanged, it is required to increase the picture element recording density in order to obtain reduced images. To this end, the frequency of a picture element clock must be altered to speed it up. The above causes the electrical system to be complicated, thereby placing on the device a large load, with the result that costs are raised.

(2) To avoid the problem in item (1), as disclosed in the above Japanese Laid-Open Patent Application No. 60-26924, it is possible to change the rotational speed of the polygonal mirror in accordance with the alternations in the spot diameter. A control system for this purpose, however, is complicated.

(3) If the diameter of the light beam is made wide so as to obtain a fine spot diameter, the wide light beam is deflected, and thus the polygonal mirror must be large-sized.

(4) The size of the image-formation lens, for forming the wide beam into an image on the surface to be scanned, becomes larger.

(5) Because the image-formation lens is used to form the wide light beam into the image, the aberration and the surface precision of the image-formation lens are strictly required.

As regards the latter conventional example:

In addition to the above problems, when the aperture stop narrows the diameter of the light beam to obtain a wide spot diameter, an Airy ring may be generated in a spot formed on the surface to be scanned, because of diffraction caused by the aperture stop. This results in a problem in that it is impossible to obtain good images.

SUMMARY OF THE INVENTION

A main object of the present invention is therefore to provide a simply constructed optical scanner which permits a spot diameter as well as the scanning range to be altered, and to provide a system using this optical scanner, the system including a device, such as an image recording device in which variable power images can easily be obtained.

Another specific object of the invention is to provide a device in which images of different sizes can be obtained by using image recording signals of the same clock, that is, without changing the signal process system.

A further specific object of the invention is to provide a device in which images of different sizes can be obtained, without varying the scanning speed of an optical scanning means, such as a polygonal mirror.

A still further specific object of the invention is to provide a device in which images of the same brightness can be obtained regardless of variable power.

DESCRIPTION OF THE PREFERRED EMBODIMENTS

First Embodiment

An embodiment, suitable for an image recording device, will be described in detail with reference to the drawings. In the image recording device, a light beam is scanned on a recording medium, such as a recording film, to form images. The recording medium is not necessarily a film, but may instead be a photosensitive recording drum or the like.

Figure 1:
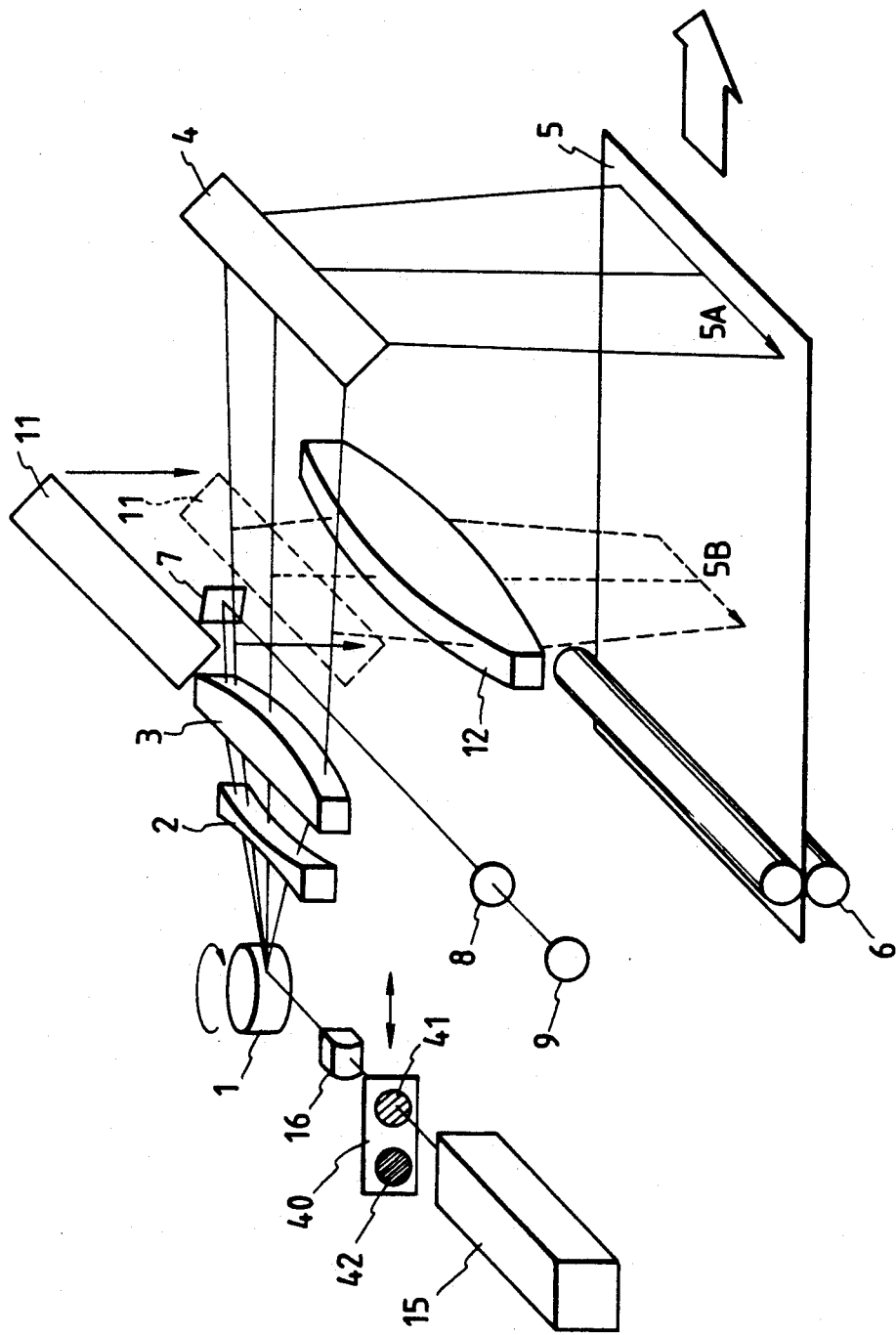
FIG. 1 is a view showing a structure of a first embodiment according to the present invention.

FIG. 1 best illustrates the features of this embodiment. In FIG. 1, a light beam is arranged so as to lead to a polygonal mirror 1, which is used as an optical deflecting means. The light beam is emitted from a light source 15 which may be a semiconductor laser, a He-Ne laser or the like, and leads to the polygonal mirror 1, after having passed through a cylindrical lens 16 which has positive power only in a sub-scanning direction. The light source 15 generates modulated light beams by the control of an unillustrated drive circuit. The intensity and pulses of these light beams are modulated in accordance with picture element density signals. Optical modulation members, such as an A/O element, may be arranged in an optical path, and may be used to modulate light beams, rather than directly modulating and driving the light source 15.

A filter unit 40, for switching the intensity levels of the light beam, is arranged in the optical path between the light source 15 and the cylindrical lens 16. The filter unit 40 has two optical attenuating filters 41, 42, each having a different density. An unillustrated system is used to select either one of these filters 41, 42, and to insert the selected filter into the optical path. In this embodiment, the density of the filter 42 is four times that of the filter 41, that is, the transmission factor of the filter 42 is about one fourth that of the filter 41.

A concave lens 2 and a toric lens 3 are fθ lenses which are used for forming a scanning light beam, deflected by the polygonal mirror 1 mentioned above, into an image on a surface to be scanned. These fθ lenses are hereinafter referred to as a first image-formation optical system. Numeral 4 denotes a mirror and numeral 5 a photosensitive recording film arranged on the surface to be scanned. Numeral 6 denotes a sub-scanning means, such as sub-scanning rollers, for sub-scanning the light beam in a direction intersecting with the above deflection direction. The recording film 5 is inserted into the sub-scanning means 6. Numeral 11 denotes a total reflection mirror which can be attached to or detached from the optical path by an unillustrated system. Numeral 12 denotes a spherical lens for forming the scanning light beam into an image on the surface to be scanned when the total reflection mirror 11 is inserted into the optical path. The total reflection mirror 11 and the spherical lens 12 are hereinafter referred to as an additional optical system. An entire optical system, in which the additional optical system is attached to the first image-formation optical system, is hereinafter referred to as a second image-formation optical system. The additional optical system is not limited to the above-described construction. An optical system in which a plurality of lenses are combined may also be constructed, so long as the same power is provided both in main and in sub-scanning directions.

In the optical system constructed above in which the total reflection mirror 11 is detached from the optical path, that is, in the first image-formation optical system, the scanning light beam, deflected by the polygonal mirror 1, is converged by the lenses 2, 3, and is reflected by the mirror 4 down to position 5A on the film 5. It then forms an image on the position 5A, thereby scanning the recording surface of the film 5 in the main scanning direction.

On the other hand, under the conditions where the total reflection mirror 11 is, as indicated by dotted lines in FIG. 1, inserted into the optical path between the first image-formation optical system and the mirror 4, and where the additional optical system is practically inserted into the space between the first image-formation optical system and the surface to be scanned, that is, in the second image-formation optical system, the light beam, converged by the lenses 2, 3, is reflected by the total reflection mirror 11, thereby impinging upon the spherical lens 12, or the additional optical system. The additional optical system has the same power both in the main and in the sub-scanning directions, thus causing the impinging scanning light beam to be formed into a reduced image at position 5B on the film 5.

In addition to the construction in which the variable power of an image is recorded on the same film, as shown in FIG. 1, films of different sizes are arranged in the positions 5A and 5B, respectively, whereby the variable power of the image may also be selectively recorded. It is also possible to employ the optical scanner in which, for example, a normal-sized silver salt film is arranged at the position 5A, whereas a small-sized film for slides is arranged at the position 5B so as to record the variable power of an image by altering the size of the image.

Figure 2:
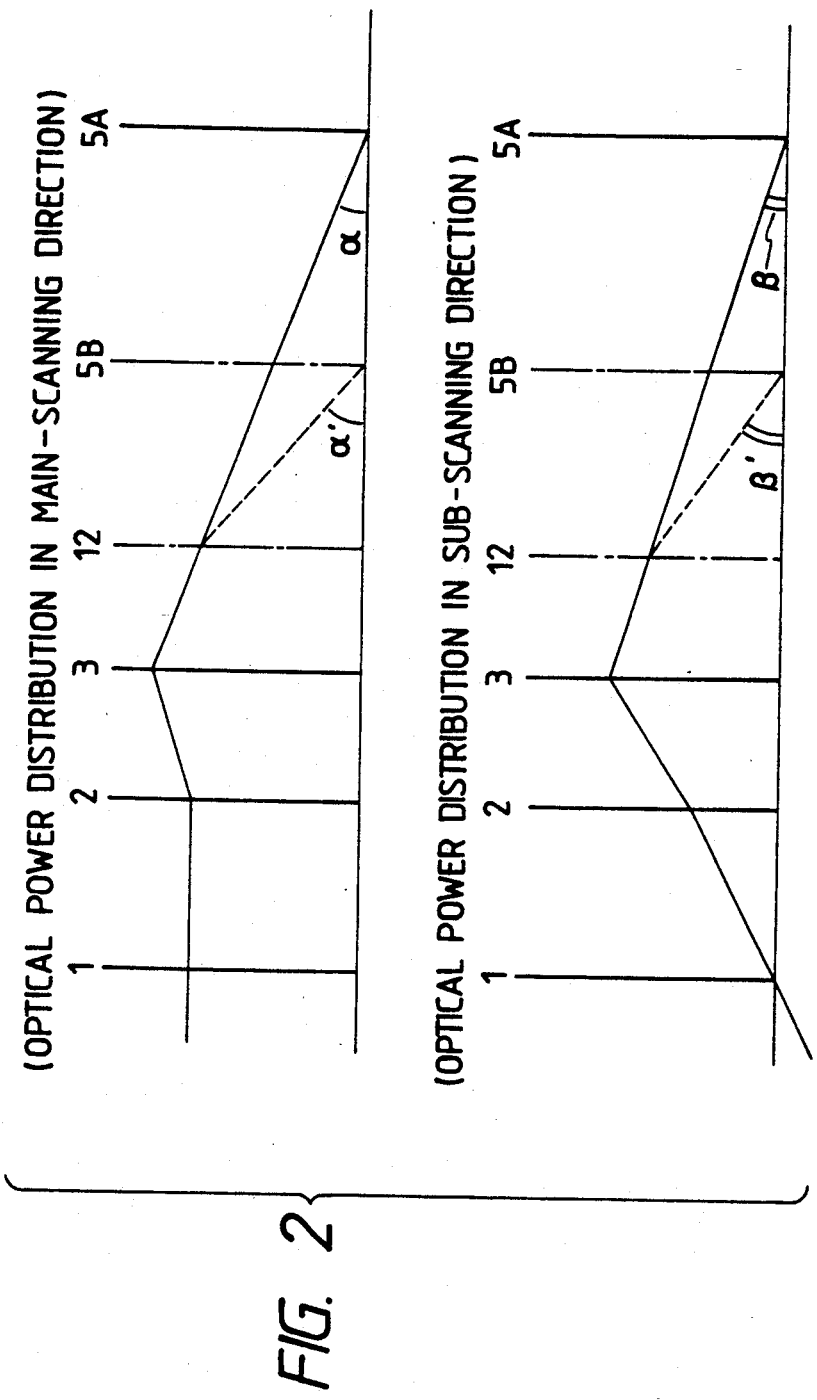
FIG. 2 is a view showing optical system power distributions.

FIG. 2 shows power distributions, in the main and sub-scanning directions, of the optical system illustrated in FIG. 1. The power distribution of the first image-formation optical system is designated by solid lines, whereas the power distribution of the second image-formation optical system is designated by dotted lines. In FIG. 2, α and β represent maximum angles (Ψ) between an optical axis and a bundle of rays on the film surface, before the mirror is inserted, while α' and β' represent maximum angles (Ψ) between the optical axis and the bundle of rays on the film surface, after the mirror is inserted.

In this embodiment on the image-formation surface, that is, on the film surface, a spot diameter "d" is related to the maximum angle Ψ as follows:

$$d = k\lambda/n \sin \Psi$$

where k is a constant; λ the wavelength of light; and n the refractive index of a medium on the film surface.

The spherical lens 12 of the additional optical system is a spherically symmetrical optical system having positive power. On the assumption that, for instance, the spherical lens 12 substantially halves focal lengths in the main and sub-scanning directions, respectively, then the maximum angles in the main and sub-scanning directions, respectively, are approximately doubled, after the total reflection mirror 11 has been inserted. According to the above equation, therefore, the spot diameters "d" on the film surface are substantially halved in the main and sub-scanning directions, respectively, after the total reflective mirror 11 has been inserted.

Referring back to FIG. 1, a small mirror 7 is disposed in the optical path between the polygonal mirror 1 and the total reflection mirror 11, in proximity to the scanning start position. The light beam reflected by the small mirror 7 passes through a lens 8 and farther to a photodetector 9, which is used for generating synchronous signals. The synchronous signals can thus be generated, in the same timing as that of the insertion of the total reflection mirror 11, by a set of optical systems and the photodetector 9, regardless of whether the mirror 11 is inserted to or detached from the optical path.

Figure 3:
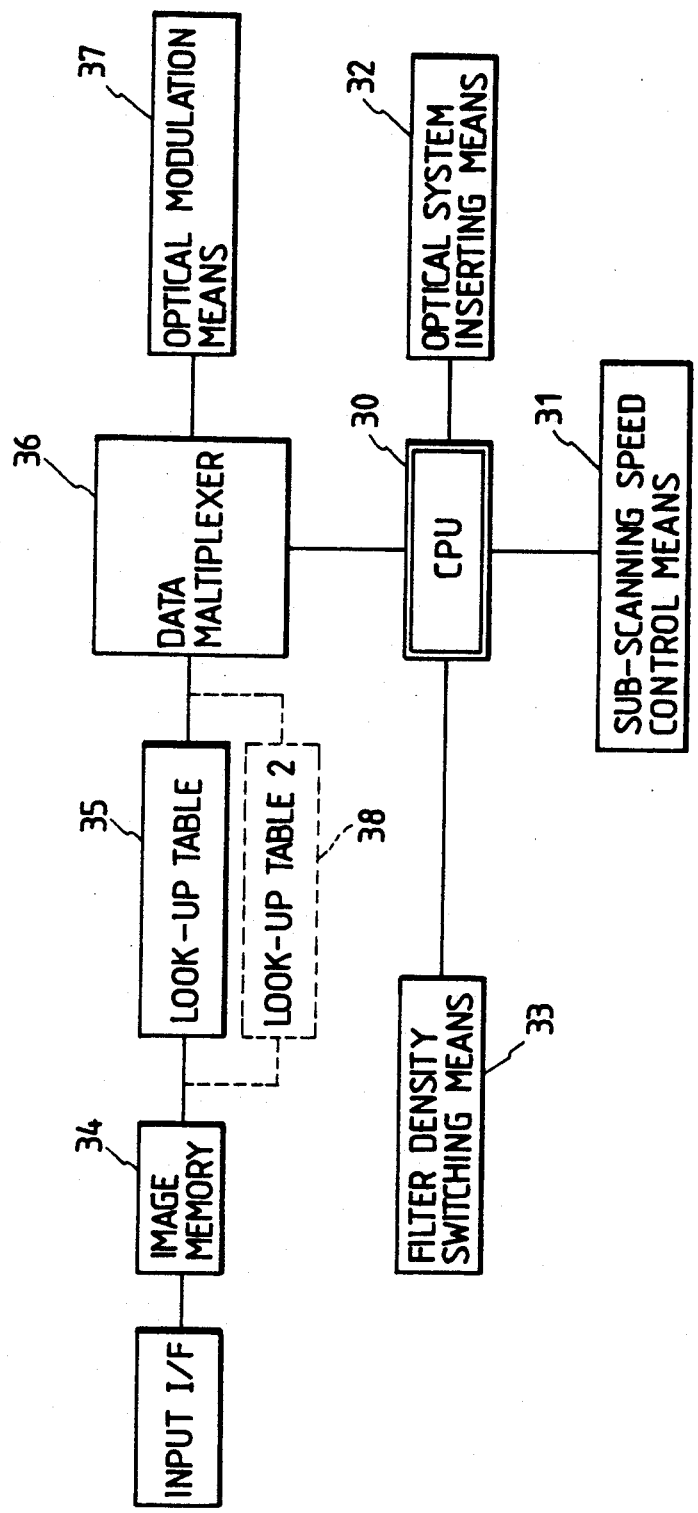
FIG. 3 is a block diagram illustrating a control system.

FIG. 3 is a block diagram illustrating the control system of this embodiment. In the embodiment, a CPU 30 controls an optical system inserting means 32, a filter density switching means 33, a sub-scanning speed control means 31, and a data multiplexer 36. The optical system inserting means 32 drives the total reflection mirror 11 to insert it to the optical path, or to detach it from the path. This driving is performed by control signals from the CPU 30. The filter density switching means 33 drives the filter unit 40 to switch the densities of the filters in accordance with the insertion of the total reflection mirror 11 into the optical path. Control signals from the CPU 30 are also used to drive the filter unit 40. According to control signals from the CPU 30, the sub-scanning speed control means 31 controls the sub-scanning speed of the sub-scanning means 6. It also varies the sub-scanning speed in accordance with the rate of change of the spot diameter "d" mentioned above while the total reflection mirror 11 is inserted into the optical path. For example, the sub-scanning speed control means 31 is set so that when the spot diameter "d" is substantially halved, so is the sub-scanning speed. When the total reflection mirror 11 is inserted into or detached from the optical path, it is possible to keep the brightness and aspect ratio of an image constant, even when the variable power is changed. This is because the sub-scanning speed is set in accordance with both variations in the filter densities and the rate of change of the spot diameter "d". If one wants to change a variable power in the sub-scanning direction, it is sufficient to alter the sub-scanning speed in accordance with the variable power.

Image data, received from the outside via an interface 29, is stored in an image memory 34. The data multiplexer 36 reads, one picture element by one picture element by one picture element, the image data stored in the image memory 34. It then modulates and drives an optical modulation means 37 by signals which have been converted by a look-up table 35 in which system characteristics are stored. The optical modulation means 37 includes a modulation circuit or a modulation element, such as an A/O element, which directly modulates and drives a semiconductor laser light source or the like. As regards modulating methods, various methods, such as an intensity modulation and a pulse width modulation, are known. The system characteristics stored in the look-up table 35 include characteristics, such as the non-linearity of the film and of the optical modulation means. Because the image data is caused to pass through the look-up table 35, the relationship between an image signal and the film density is rendered substantially linear.

The control over intensity levels of light will now be described. Assuming that the quantity of a light beam, emitted from the light source 15 and conducted by the optical system, is invariably constant, the main scanning speed of a light spot becomes slower, after the total reflection mirror 11 has been inserted into the optical path, as compared with before the mirror 11 is inserted. This is because the scanning range has shortened, while an image clock and the number of revolutions of the polygonal mirror 1 remain unchanged. Furthermore, since the sub-scanning speed is also controlled so as to slow down, the energy density of light on the surface of the film 5 increases. This results in a problem in that the brightness level of an image formed, before the total reflection mirror 11 is inserted into the optical path, differs from that of an image formed after the mirror 11 has been inserted.

This embodiment overcomes such a problem by adjusting, in accordance with variable power, the intensity levels of light conducted by the optical system. In the embodiment, the filter unit 40, which permits density switching, is arranged between the light source 15 and the cylindrical lens 16. The filter unit 40 is driven to insert one of the two filters 41, 42, each having a different density, into the optical path, this filter unit 40 being driven synchronously with the insertion or detachment of the total reflection mirror 11. In this embodiment, when the mirror 11 is inserted and the optical system is switched, since the focal length is designed so as to be halved, the main scanning range as well as the main scanning speed are proportionately reduced to about one half. Furthermore, in view of the fact that at this time the sub-scanning speed is also controlled to be substantially halved, the energy density of light on the position 5B of the film 5 approximately quadruples, as compared with the energy density of light on the position 5A.

The filter 41 is selected under normal conditions where the total reflection mirror 11 is withdrawn from the optical path and the first image-formation optical system is selected. When the mirror 11 is inserted into the optical path and the second image-formation optical system is then selected, in conjunction with this selection, the filter unit 40 is driven to switch over to the filter 42, which has a density four times that of the filter 41, in order to reduce the transmission factor to one fourth. As a result, the light energy of the above spot light per unit becomes substantially equal, before and after the total reflection mirror 11 is inserted into the optical path. An image reduced by one half with equal image density is thus obtained. In this embodiment, the two filters 41, 42 are not always required. If the filter 41 is not utilized, the filter 42 with a transmission factor of 25% may alone be employed. In other words, this fact implies that the filter 41 has a transmission factor of 100%.

The above description is related to a construction in which the intensity of light is altered by switching the filters. To further simplify the optical scanner, when the total reflection mirror 11 is inserted, at the same time the output level of the light source 15 is reduced by one fourth by using the modulation means. No filters are thus required. In such a case, however, since the extinction ratio of the intensity of light cannot be obtained substantially, filters are preferably used for an optical scanner in which an intensity modulation of multi-gradation is necessary.

Though the total reflection mirror 11 is used in this embodiment, a half mirror or a beam splitter may also be used to obtain two identical images of difference sizes at the same time. At this time, if the ratios of transmission and reflection are made different, and the quantity of light on both the spots of the recording medium is rendered equal, then images of the same brightness level can be obtained. It is therefore possible to obtain the same effect as when the filters are used as described above.

The foregoing pertains to the basic construction of this embodiment. When it is required to adjust an image density more precisely, the non-linearity of a medium to be scanned, that is, the non-linearity of a film must be considered. As an example of the non-linearity of the film, a reciprocity law failure caused by varied scanning speed may be cited. The reciprocity law failure is a phenomenon in which an image density varies when the exposure time is different, even when light energy with equal quantity is provided. In other words, when a reciprocity law failure occurs, because of different scanning speed, it is impossible to obtain a precisely uniform image density distribution, even when, as described above, the density of light energy on the film is rendered equal.

To adjust the image density, together with switching the above filters, a means for switching the look-up table is provided. In accordance with the selection of the first and second image-formation optical systems, the optical scanner is constructed so as to switch over to a second look-up table 38, indicated by dotted lines, from the look-up table 35 in FIG. 3, and vice versa. The system characteristics of the first image-formation optical system are stored in the look-up table 35, whereas the system characteristics of the second image-formation optical system are stored in the second look-up table 38. This arrangement will provide much better variable power images. If a filter switching system is not attached, a system may instead be used in which only the look-up tables are switched. It is preferable to use both the filters and the look-up tables in order to obtain images of high gradations.

This embodiment hitherto described brings about the following effects:

(1) Since focal lengths in the main and subscanning directions are made relatively short, a spot diameter formed on the surface of the film 5 is substantially made small in a proportionate manner.

(2) A face collapse correction function of the polygonal mirror 1 is retained while the additional optical system 11 is inserted, because a conjugate relationship between the polygonal face and the film 5 is maintained in the sub-scanning direction.

(3) The additional optical system keeps the balance of aberration, thereby retaining an fθ correction function, regardless of whether the additional optical system is inserted into the optical path or detached from it.

(4) A variable power image, which is obtained before the additional optical system is inserted, is obtained while a picture element clock remains unchanged. That is, it is not necessary to alter the clock frequency before or after the insertion of the additional optical system.

(5) Since the diameter of the scanning light beam in the polygonal mirror 1 does not alter, it is not necessary to change the size of the polygonal mirror 1.

(6) Because the diameter of the above scanning light beam, impinging upon the first image-formation optical system, remains unchanged, the precision of the fθ lens faces may be the same as that of the conventional one.

(7) It is possible to keep the aspect ratio of a record image constant, before and after the mirror 11 is inserted into the optical path, since the picture element density can be altered at will in the sub-scanning direction. In other words, it is possible to obtain a variable power image of the same variable power both in the vertical and in the horizontal directions. The aspect ratio of an image can be used as a desired ratio.

(8) Only one set of timing signal detection means is capable of generating synchronous signals in the same timing as that of the insertion and detachment of the total reflection mirror 11.

(9) Images of the same brightness can be obtained regardless of variable power.

Second Embodiment

A second embodiment, in which the present invention is applied to an optical system of another configuration, will be described hereinafter with reference to FIGS. 4 to 6. The same reference characters as those in FIG. 1 denote like or similar members.

Figure 4:
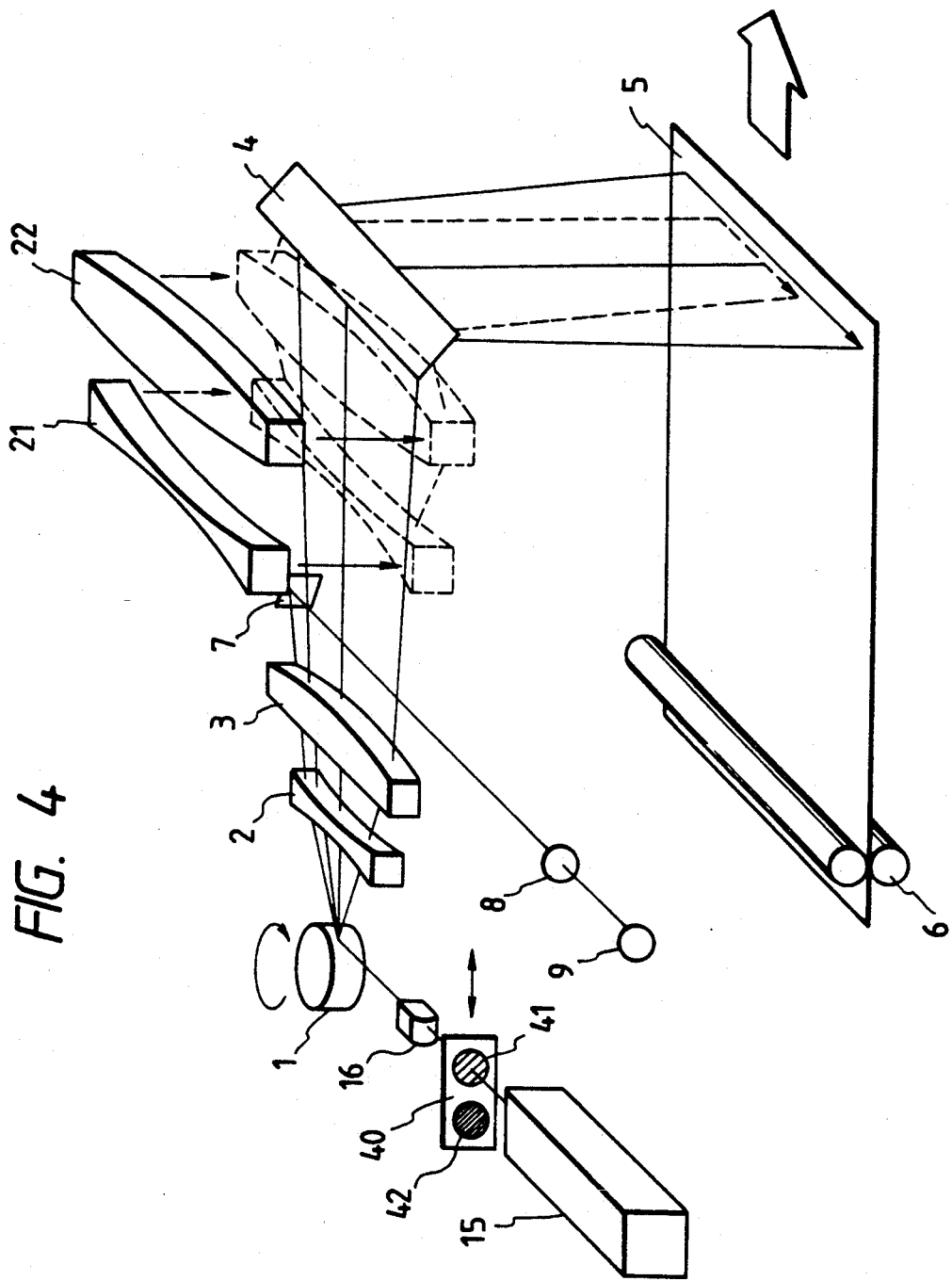
FIG. 4 is a view showing a structure of a second embodiment according to the invention.
Figure 5:
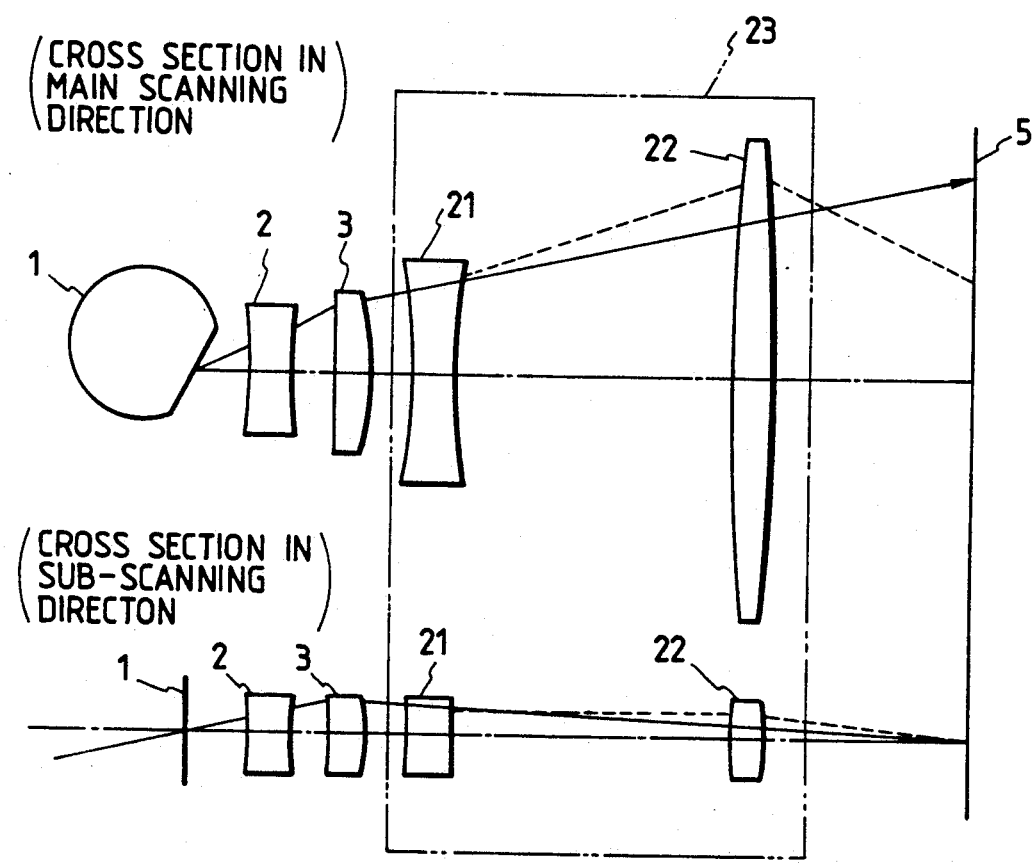
FIG. 5 is a detailed view of an optical system.

FIG. 4 is a view showing an entire image recording device, and FIG. 5 is a detailed view of the optical system for the image recording device in FIG. 4. In FIGS. 4 and 5, an additional optical system, composed of a pair of fθ lenses, a concave lens 21 and a convex lens 22, constitutes a so-called retrofocus optical system, and has positive power. The additional optical system 23 is capable of being selectively inserted into an optical path, or detached from it by an unillustrated system. Once it is inserted into the optical path, it is combined with a first image-formation optical system, fixed lenses 2, 3, to form a second image-formation optical system.

The additional optical system 23 is the retrofocus optical system, so that the entire optical path length remains unchanged, before or after it is inserted into the optical path. That is, despite the fact that the focal length is shortened after the additional optical system 23 has been inserted into the optical path, the optical path length to the surface to be scanned remains unchanged. It is thus possible to alter the spot diameter, without changing the position of an image to be formed, before or after the additional optical system 23 is inserted into the optical path, whereby one line on the surface to be scanned can be main scanned by varying the scanning range. The spot diameter and the scanning range are proportionately altered, before or after the additional optical system 23 is inserted into the optical path.

The construction of the control system in this embodiment is the same as that in FIG. 3. When the additional optical system is inserted into the optical path or detached from it, the filter density is simultaneously switched, and the sub-scanning speed is varied. It is thus possible to obtain variable power images of the same magnitude and brightness in the vertical and horizontal directions. To obtain more precise variable power images, as described in the first embodiment, it is desirable to provide the second look-up table 38, which can be switched.

Figure 6:
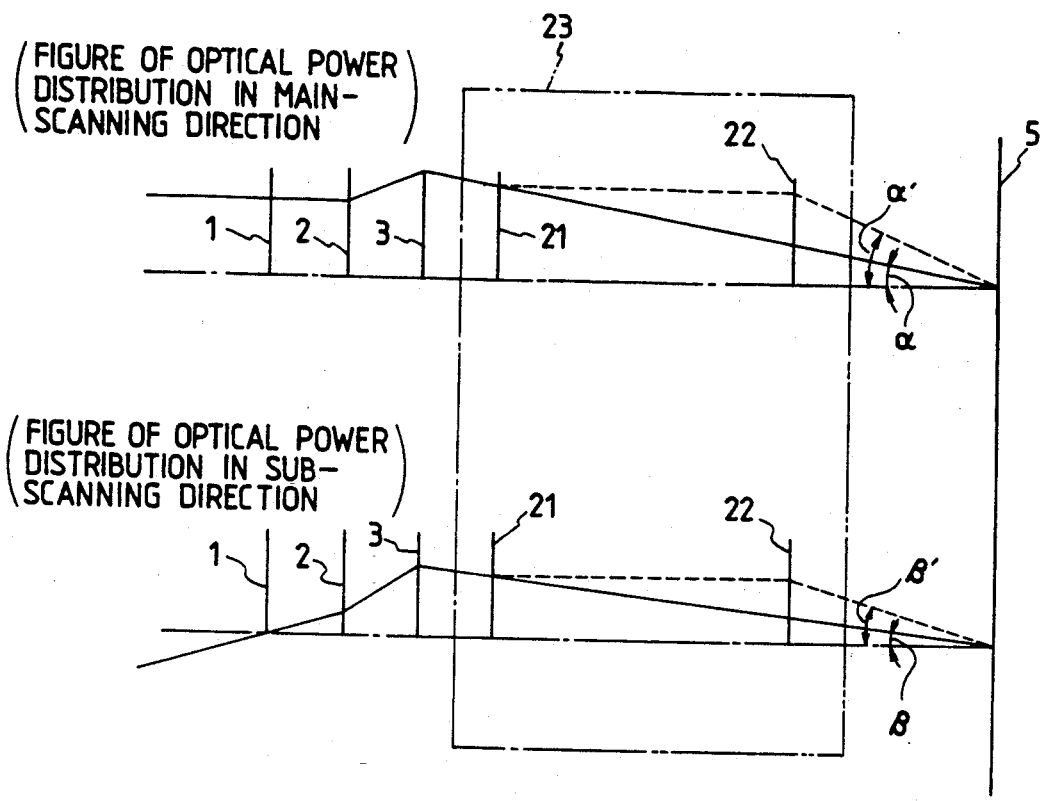
FIG. 6 is a view showing optical system power distributions.
Figure 7:
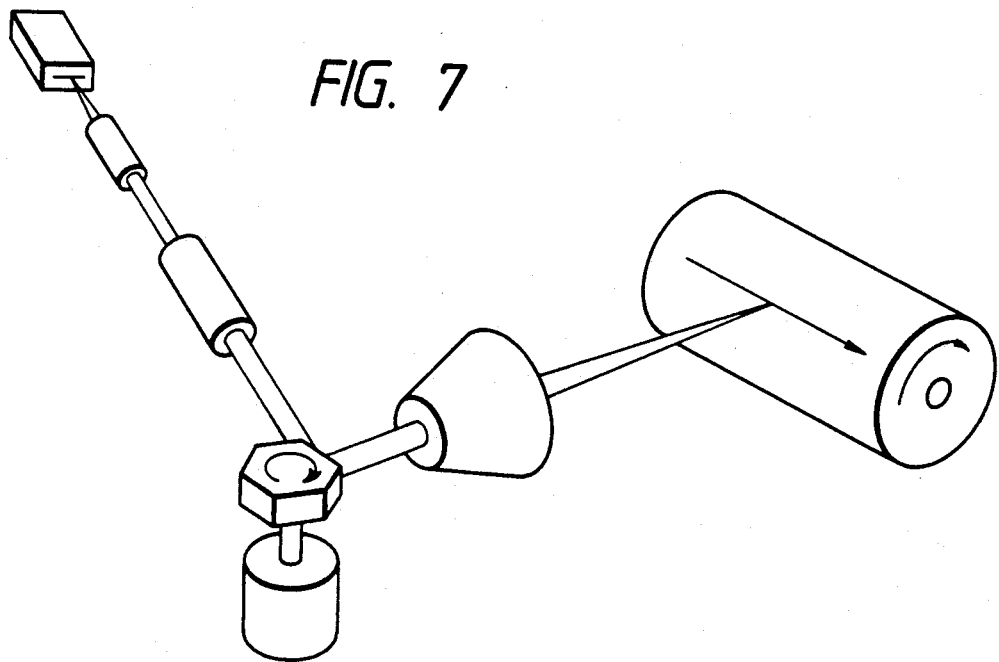
FIG. 7 is a view illustrating the conventional art.

FIG. 6 is a view showing power distributions, in the main and sub-scanning directions, of the optical system illustrated in FIG. 5. The power distribution of the second image-formation optical system, in which the additional optical system 23 is inserted into the optical path, is indicated by dotted lines in FIG. 6.

This embodiment makes it possible to record different images, with the same brightness and different magnification, on the same scanning position.

In the above two embodiments, though the additional optical system is employed whose power is fixed and which can be inserted into the optical path or detached from it, a zoom optical system may also be employed. The zoom optical system allows the spot diameter to be altered at will. It may be inserted into the optical path or be detached from it in the same manner as in the above embodiments, or it may be fixed to the optical path. When the zoom optical system is employed, the filter density is caused to continuously alter in accordance with the degree of zooming. The above can be achieved by providing a construction in which, for example, an annular filter whose density is continuously altered is prepared, and is caused to rotate in accordance with the degree of zooming, whereby an appropriate density part of the filter is inserted into the optical path.

Third Embodiment

A third embodiment of the present invention will now be described. The construction of this embodiment is similar to that in FIG. 1 or 4, and the third embodiment will be described with reference to FIG. 1 or 4.

In FIG. 1 or 4, an anamorphic optical system, used as an additional optical system, is employed which is composed of a plurality of lenses, each having different power and the same focal plane in the main and sub-scanning directions, respectively. In the above construction, a second image-formation optical system, in which the additional optical system is inserted into the optical path, permits the aspect ratios of spot shapes in the main and sub-scanning directions to be set to a predetermined value. Furthermore, if a second image-formation optical system is an anamorphic zoom optical system, it is possible to arbitrarily alter not only the aspect ratio, but also the spot size and the scanning range.

Since the additional optical system in the embodiment of FIG. 1 or 4 has the same positive power both in the main and in the sub-scanning directions, the spot diameters on the surface to be scanned in the main and sub-scanning directions, respectively, become small in a substantially proportionate manner. The ratio of the spot diameters in the main and sub-scanning directions, therefore, remain unchanged regardless of the insertion or detachment of the additional optical system. This is a characteristic of the third embodiment.

To record fine images, such as slides, rendering the spot diameter in the sub-scanning direction smaller than when normal images are recorded, may improve the image quality. Moreover, there is a case in which when the control over the sub-scanning speed by the sub-scanning speed control means is limited, it is necessary to alter the spot diameter in the sub-scanning direction to prevent the image quality from deteriorating. This embodiment provides an optical system suitable for such a case.

In all the embodiments hitherto described, reduced images are obtained by providing an additional optical system having positive power. On the contrary, when an additional optical system having negative power is provided, the spot size and the scanning range are enlarged, whereby enlarged variable power images are obtained. In such a case, the relation for the density of the two filters 41, 42 are reversed to those mentioned above.

Although the above-described embodiments are applied to the image recording device, the present invention is not limited to such image recording devices, but may also be extensively applied to devices using optical scanning. For example, when the invention is applied to an image reading device in which optical scanning is used to read images, the spot diameter and the scanning range are altered in accordance with the size of the image to be read. It is thus possible to scan and read images of different sizes by means of a simple optical system. In this case, the intensity of light of a scanning beam can be kept constant.

I claim:

1. An optical scanner having a variable power function, comprising:

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range;

wherein with respect to said first image-formation optical system, said second image-formation optical system is an optical system to which an additional optical system which can be inserted into or detached from an optical path between said scanning means and the surface to be scanned is added; and wherein said additional optical system is a retrofocus optical system, said first image-formation optical system and said second image-formation optical system forming the light beam into an image on the same scanning line.

2. An optical scanner having a variable power function according to claim 1, wherein said additional optical system is an anamorphic optical system, and wherein size ratios of spots of said first image-formation optical system and said second image-formation optical system in the scanning direction differ from those in a direction perpendicular to the scanning direction.

3. An optical scanner having a variable power function, comprising:

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range;

wherein with respect to said first image-formation optical system, said second image-formation optical system is an optical system to which an additional optical system which can be inserted into or detached from an optical path between said scanning means and the surface to be scanned is added; and wherein said additional optical system is an anamorphic optical system, and wherein size ratios of spots of said first image-formation optical system and said second image-formation optical system in the scanning direction differ from those in a direction perpendicular to the scanning direction.

4. An optical scanner having a variable power function, comprising:

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range; and wherein said second image-formation optical system has a zoom optical system.

5. An optical scanner having a variable power function, comprising:

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range; and level altering means for altering intensity levels of the light beam in accordance with switching of said first and second image-formation optical systems so that density of light energy on the surface to be scanned may become substantially the same by means of said first image-formation optical system and said second image-formation optical system.

6. An optical scanner having a variable power function according to claim 5, wherein said level altering means has optical attenuating member which is arranged in the optical path.

7. An optical scanner having a variable power function according to claim 6, wherein said optical attenuating member includes optical filters.

8. A two-dimensional optical scanner having a variable power function, comprising:

a light source for generating a light beam;

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range; and sub-scanning means for shifting the light beam relative to the surface to be scanned in a sub-scanning direction intersecting with the main scanning direction of said scanning means;

wherein with respect to said first image-formation optical system, said second image-formation optical system is an optical system to which an additional optical system which can be inserted into or detached from an optical path between said scanning means and the surface to be scanned is added; and wherein said additional optical system is a retrofocus optical system, said first image-formation optical system and said second image-formation optical system forming the light beam into an image on the same scanning line.

9. A two-dimensional optical scanner having a variable power function according to claim 8, wherein said additional optical system is an anamorphic optical system, and wherein size ratios of spots of said first image-formation optical system and said second image-formation optical system in the scanning direction differ from those in the sub-scanning direction.

10. A two-dimensional optical scanner having a variable power function, comprising:

a light source for generating a light beam;

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range; and sub-scanning means for shifting the light beam relative to the surface to be scanned in a sub-scanning direction interacting with the main scanning direction of said scanning means;

wherein said additional optical system is an anamorphic optical system, and wherein size ratios of spots of said first image-formation optical system and said second image-formation optical system in the scanning direction differ from those in the sub-scanning direction.

11. A two-dimensional optical scanner having a variable power function, comprising:

a light source for generating a light beam;

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range; and sub-scanning means for shifting the light beam relative to the surface to be scanned in a sub-scanning direction intersecting with the main scanning direction of said scanning means;

wherein said second image-formation optical system has a zoom optical system.

12. A two-dimensional optical scanner having a variable power function to claim 10, comprising:

a light source for generating a light beam;

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range; and sub-scanning means for shifting the light beam relative to the surface to be scanned in a sub-scanning direction intersecting with the main scanning direction of said scanning means;

level altering means for altering intensity levels of the light beam in accordance with switching of said first and second image-formation optical systems so that density of light energy of the surface to be scanned may become substantially the same by means of said first image-formation optical system and said second image-formation optical system.

13. A two-dimensional optical scanner having a variable power function according to claim 12, wherein said level altering means has optical attenuating member which is arranged in the optical path.

14. A two-dimensional optical scanner having a variable power function according to claim 13, wherein said optical attenuating member includes optical filters.

15. A two-dimensional optical scanner having a variable power function, comprising:

a light source for generating a light beam;

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range; and sub-scanning means for shifting the light beam relative to the surface to be scanned in a sub-scanning direction intersecting with the main scanning direction of said scanning means;

means for controlling a shift speed of said sub-scanning means, said control means altering the shift speed in accordance with selection of said first image-formation optical system and said second image-formation optical system.

16.

a light source for generating a light beam;

scanning means for scanning a light beam from a light source;

a first image-formation optical system for forming the light beam scanned by said scanning means into an image in a first spot diameter with respect to a scanning direction, on a surface to be scanned, said first image-formation optical system scanning the surface to be scanned within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the surface to be scanned, said second image-formation optical system scanning the surface to be scanned within a second scanning range which is different from said first scanning range; and sub-scanning means for shifting the light beam relative to the surface to be scanned in a sub-scanning direction intersecting with the main scanning direction of said scanning means;

detection means for generating a synchronous, said detection means being disposed between said scanning means and said second image-formation optical system.

17. An image recording apparatus having a variable power function, comprising:
a light source for generating a light beam;
optical modulation means for modulating the light beam in accordance with image data;
scanning means for scanning said modulated light beam in a main scanning direction;
a first image-formation optical system for forming the light beam scanned by said scanning means into an image in a first spot diameter with respect to the main scanning direction, on a recording medium, said first image-formation optical system scanning the recording medium within a first scanning range;
a second image-formation optical system, utilizing said first image-formation optical system and at least part of an optical system, for forming the light beam scanned by said scanning means into an image in a second spot diameter which is different from said first spot diameter, with respect to the scanning direction, on the recording medium, said second image-formation optical system scanning the recording medium within a second scanning range which is different from said first scanning range;
sub-scanning means for shifting the light beam relative to a recording medium in a sub-scanning direction intersecting with the main scanning direction of said scanning means;
image data receiving means for inputting image data from the outside; and
image data storing means for storing the image data which has been input.

18. An image recording device having a variable function according to claim 17, wherein with respect to said first image-formation optical system, said second image-formation optical system is an optical system to which an additional optical system which can be inserted into or detached from an optical path between said scanning means and said recording medium is added.

19. An image recording device having a variable function according to claim 17, wherein said recording medium includes a photosensitive recording film.

20. An image recording device having a variable function according to claim 19, wherein said recording film includes a slide film.

21. An image recording device having a variable function according to claim 17, wherein said recording medium includes a photosensitive recording drum.

22. An image recording device having a variable function according to claim 17, wherein said optical modulation means has a modulation circuit for modulating and driving said light source so as to generate a modulated light beam.

23. An image recording device having a variable function according to claim 17, wherein said light source has a semiconductor laser.

24. An image recording device having a variable function according to claim 22, wherein said optical modulation means has a modulation element, arranged in the optical path, for modulating the light beam.

25. An image recording device having a variable function according to claim 17, wherein said optical modulation means includes an A/O element.

26. An image recording device having a variable function according to claim 17, wherein said light source has a laser.

27. An image recording device having a variable power function, comprising:
a light source for generating a light beam;
optical modulation means for modulating the light beam in accordance with image data;
scanning means for scanning said modulated light beam in a main scanning direction;
a first image-formation optical system for forming the light beam scanned by said scanning means into an image in a first spot diameter with respect to the main scanning direction, on a recording medium, said first image-formation optical system scanning the recording medium within a first scanning range;
a second image-formation optical system, utilizing said first image-formation optical system and at least part of an optical system, for forming the light beam scanned by said scanning means into an image in a second spot diameter which is different from said first spot diameter, with respect to the scanning direction, on the recording medium, said second image-formation optical system scanning the recording medium within a second scanning range which is different from said first scanning range;
sub-scanning means for shifting the light beam relative to a recording medium in a sub-scanning direction intersecting with the main scanning direction of said scanning means;
level altering means for altering intensity levels of the light beam in accordance with switching of said first and second image-formation optical system so that density of light energy on a surface to be scanned may become substantially the same by means of said first image-formation optical system and said second image-formation optical system;
wherein said level altering means has an optical attenuating member which is arranged in the optical path; and
wherein said optical attenuating member includes optical filters.

28. A image recording device having a variabler power function comprising:
a light source for generating a light beam;
optical modulation means for modulating the light beam in accordance with image data;
scanning means for scanning said modulated light beam in a main scanning direction;
a first image-formation optical system for forming the light beam scanned by said scanning means into an image in a first spot diameter with respect to the main scanning direction, on a recording medium, said first image-formation optical system scanning the recording medium within a first scanning range;
a second image-formation optical system, utilizing said first image-formation optical system and at least part of an optical system, for forming the light beam scanned by said scanning means into an image in a second spot diameter which is different from said first spot diameter, with respect to the scanning direction, on the recording medium, said second image-formation optical system scanning the recording medium within a second scanning range which is different from said first scanning range;

sub-scanning means for shifting the light beam relative to a recording medium in a sub-scanning direction intersecting with the main scanning direction of said scanning means; and means for controlling a shift speed of said sub-scanning means, said control means altering the shift speed in accordance with selection of said first image-formation optical system and said image-formation optical system.

29. An image recording device having a variable power function, comprising:

a light source for generating a light beam;

optical modulation means for modulating the light beam in accordance with image data;

scanning means for scanning said modulated light beam in a main scanning direction;

a first image-formation optical system for forming the light beam scanned by said scanning means into an image in a first spot diameter with respect to the main scanning direction, on a recording medium, said first image-formation optical system scanning the recording medium within a first scanning range;

a second image-formation optical system, utilizing said first image-formation optical system and at least part of an optical system, for forming the light beam scanned by said scanning means into an image in a second spot diameter which is different from said first spot diameter, with respect to the scanning direction, on the recording medium, said second image-formation optical system scanning the recording medium within a second scanning range which is different from said first scanning range;

sub-scanning means for shifting the light beam relative to a recording medium in a sub-scanning direction intersecting with the main scanning direction of said scanning means;

detection means for generating a synchronous signal, said detection means being disposed between said scanning means and said second image-information optical system.

30. An optical apparatus comprising:

a deflector for deflecting a light beam which is utilized to form at least a first light spot and a second light spot, diameters of which are different from each other; and selecting means for selecting one of said first and second light spots, said selecting means having an optical member which is movable with respect to an optical path between said deflector and a surface on which the selected light spot is scanned.

31. An apparatus according to claim 30, further comprising means includes a light source for generating said light beam and a filter which is movable with respect to an optical path between said light source and said deflector.

32. An apparatus according to claim 31, wherein said altering means includes a light source for generating said light beam and a filter which is movable with respect to an optical path between said light source and said deflector.

33. An apparatus according to claim 30, further comprising driving means for moving an object in a direction intersecting the scanning direction of the selected spot, said driving means changing the moving velocity of said object according to the selection of said first or second light spots.

34. An apparatus according to claim 30, wherein said optical member includes an optical element which acts to converge the light beam.

35. An optical apparatus comprising:

a deflector for deflecting a light beam which is utilized to form at least a first light spot and a second light spot, diameters of which are different from each other; and selecting means for selecting one of said first and second light spots, said selecting means having a zoom optical system disposed in an optical path between said deflector and a surface on which the selected light spot is scanned.

36. An apparatus according to claim 35, further comprising means for altering the intensity of the light beam according to the selection of said selecting means.

37. An apparatus according to claim 36, wherein said altering means includes a light source for generating said light beam and a filter which is movable with respect to an optical path between said light source and said deflector.

38. An apparatus according to claim 35, further comprising driving means for moving an object in a direction intersecting the scanning direction of the selected light spot, said driving means changing the moving velocity of said object according to the selection of said selecting means.

39. An optical apparatus comprising:

a deflector for deflecting a light beam which is utilized to form at least a first light spot and a second light spot, diameters of which are different from each other;

selecting means for selecting one of said first and second light spots; and means for altering the intensity of the light beam according to the selection of said selecting means.

40. An apparatus according to claim 39, wherein said altering means includes a light source for generating said light beam and a filter which is movable with respect to an optical path between said light source and said deflector.

41. An apparatus according to claim 39, further comprising driving means for moving an object in a direction intersecting a scanning direction of the selected light spot, said driving means changing the moving velocity of said object according to the selection of said selecting means.

42. An image recording apparatus comprising:

a deflector for deflecting a light beam which is utilized to form at least a first light spot and a second light spot, diameters of which are different from each other;

selecting means for selecting one of said first and second light spots; and driving means for moving a recording medium in a direction intersecting a scanning direction of the light spot selected by said selecting means, said driving means changing the moving velocity of said recording medium according to the selection of said selecting means.

43. An apparatus according to claim 42, wherein said selecting means includes an optical member which is movable with respect to an optical path between said deflector and said recording medium.

44. An apparatus according to claim 42, wherein said selecting means includes a zoom optical system disposed in an optical path between said deflector and said recording medium.

45. An apparatus according to claim 42, further comprising means for altering the intensity of the light beam according to the selection of said selecting means.

46. An apparatus according to claim 45, wherein said altering means includes a light source for generating said light beam and a filter which is movable with respect to an optical path between said light source and said deflector.

* * * * *

UNITED STATES PATENT AND TRADEMARK OFFICE
CERTIFICATE OF CORRECTION

PATENT NO. : 5,235,349

DATED : August 10, 1993

INVENTOR(S) : Tatsuya Yamazaki

It is certified that error appears in the above-identified patent and that said Letters Patent is hereby corrected as shown below:

Claim 8, column 12, line 9, change the first occurrence of "a" to --the-- and change the second occurrence of "a" to --said--;
    column 12, line 10, change "source;" to --source in a main scanning direction;--;
    column 12, line 13, change "to a" to --to the main--; and
    column 12, line 23, change "scanning" to --main scanning--.

Claim 10, column 12, line 54, change the first occurrence of "a" to --the-- and change the second occurrence of "a" to --said--;
    column 12, line 55, change "source;" to --source in a main scanning direction;--; and
    column 12, line 58, change "to a" to --to the main--;
    column 12, line 68, change "scanning" to --main scanning--; and
    column 13, line 7, change "interacting" to --intersecting--.

UNITED STATES PATENT AND TRADEMARK OFFICE
CERTIFICATE OF CORRECTION

PATENT NO. : 5,235,349
DATED : August 10, 1993
INVENTOR(S) : Tatsuya Yamazaki

It is certified that error appears in the above-identified patent and that said Letters Patent is hereby corrected as shown below:

Claim 11, column 13, line 18, change the first occurrence of "a" to --the-- and change the second occurrence of "a" to --said--;
column 13, line 19, change "source;" to --source in a main scanning direction;--; and
column 13, line 22, change "to a" to --to the main--; and
column 13, line 32, change "scanning" to --main scanning--.

Claim 12, column 13, line 44, change "function to claim 10" to --function--;
column 13, line 46, change the first occurrence of "a" to --the-- and change the second occurrence of "a" to --said--;
column 13, line 47, change "source;" to --source in a main scanning direction;--; and
column 13, line 50, change "to a" to --to the main--;
column 13, line 60, change "scanning" to --main scanning--; and
column 13, line 68, change "means;" to --means; and--.

UNITED STATES PATENT AND TRADEMARK OFFICE
CERTIFICATE OF CORRECTION

PATENT NO.   : 5,235,349
DATED        : August 10, 1993
INVENTOR(S)  : Tatsuya Yamazaki It is certified that error appears in the above-identified patent and that said Letters Patent is hereby corrected as shown below:

Claim 15, column 14, line 18, change the first occurrence of "a" to --the-- and change the second occurrence of "a" to --said--;

column 14, line 19, change "source;" to --source in a main scanning direction;--; and column 14, line 22, change "to a" to --to the main--; and column 14, line 32, change "scanning" to --main scanning--.

Claim 16, column 14, line 46, change "16." to --16. A two-dimensional optical scanner having a variable power function, comprising:--;

column 14, line 48, change the first occurrence of "a" to --the-- and change the second occurrence of "a" to --said--;

column 14, line 49, change "source;" to --source in a main scanning direction;--; and column 14, line 52, change "to a" to --to the main--;

column 14, line 62, change "scanning" to --main scanning--;

column 14, line 66, delete "and";

column 15, line 2, change "means;" to --means; and--; and column 15, line 3, change "synchronous," to --synchronous signal,--.

UNITED STATES PATENT AND TRADEMARK OFFICE
CERTIFICATE OF CORRECTION

PATENT NO. : 5,235,349
DATED : August 10, 1993
INVENTOR(S) : Tatsuya Yamazaki

It is certified that error appears in the above-identified patent and that said Letters Patent is hereby corrected as shown below:

Claim 17, column 15, line 27, change "scanning" to --main scanning--.

Claim 23, column 15, line 63, change "claim 17," to --claim 22,--.

Claim 24, column 15, line 66, change "claim 22," to --claim 17,--.

Claim 27, column 16, line 35, change "means;" to --means; and--; and
    column 16, line 38, change "system" to --systems--.

Claim 28, column 16, line 48, change "A" to --An-- and change "variabler " to --variable--;
    column 16, line 68, change "scanning" to --main scanning--; and
    column 17, line 12, change "said" to --said second--.

Claim 29, column 17, line 34, change "scanning" to --main scanning--; and
    column 17, line 42, change "means;" to --means; and--.

UNITED STATES PATENT AND TRADEMARK OFFICE
CERTIFICATE OF CORRECTION

PATENT NO. : 5,235,349
DATED : August 10, 1993
INVENTOR(S) : Tatsuya Yamazaki

It is certified that error appears in the above-identified patent and that said Letters Patent is hereby corrected as shown below:

Claim 31, column 17, lines 58 to 61, change "includes a light source for generating said light beam and a filter which is movable with respect to an optical path between said light source and said deflector" to --for altering the intensity of the light beam according to the selection of said selecting means--.

Signed and Sealed this

Twenty-fourth Day of May, 1994

Attest:

BRUCE LEHMAN

Attesting Officer

Commissioner of Patents and Trademarks